UNITED STATES PATENT OFFICE.

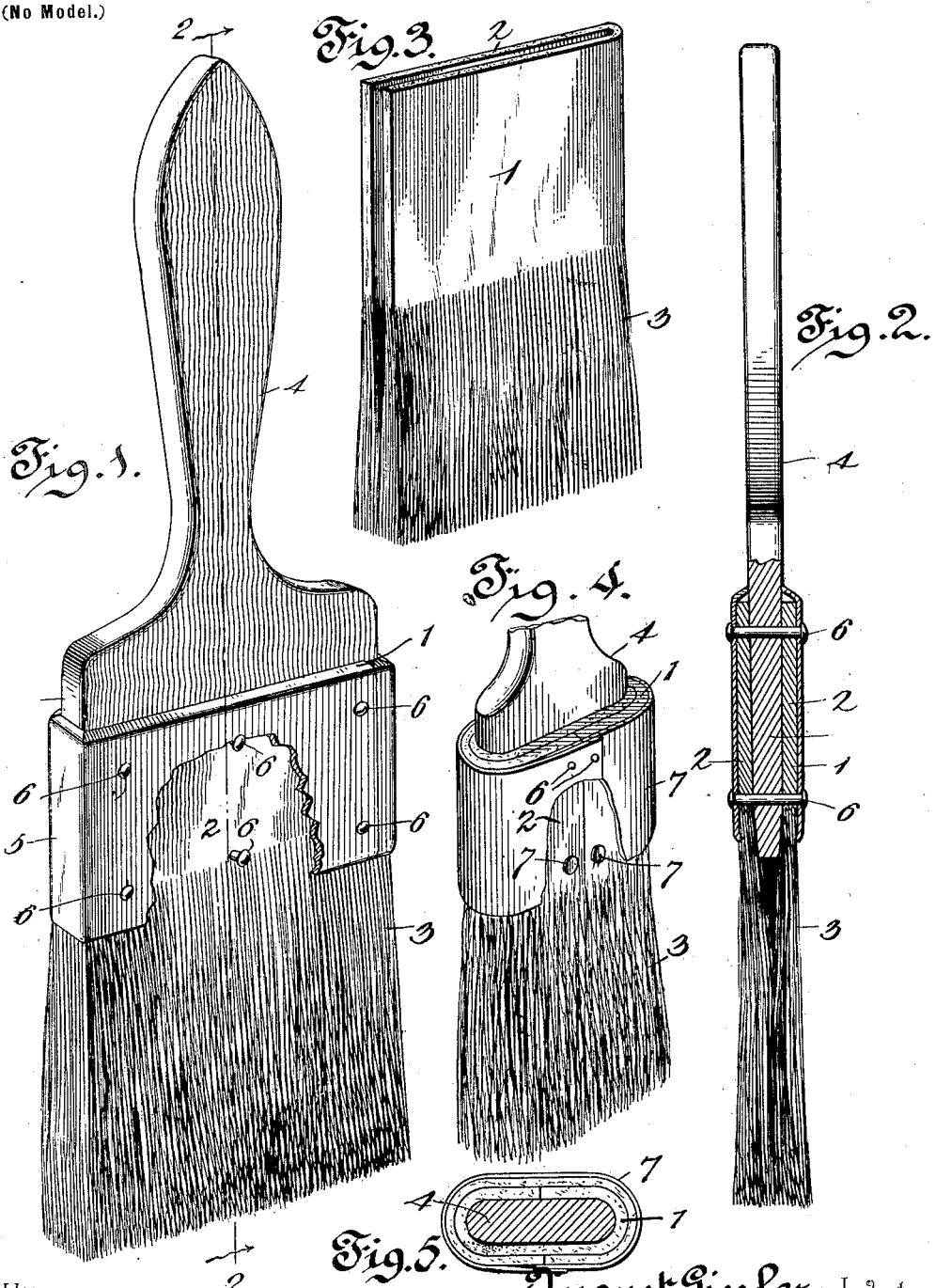

AUGUST GISSLER, OF COCOS ISLAND, OFF COSTA RICA.

BRUSH.

SPECIFICATION forming part of Letters Patent No. 699,752, dated May 13, 1902.

Application filed November 6, 1901. Serial No. 81,333. (No model.)

*To all whom it may concern:*

Be it known that I, AUGUST GISSLER, a subject of the Emperor of Germany, residing on Cocos Island, in the Pacific Ocean, off Costa Rica, have invented a new and useful Brush, of which the following is a specification.

This invention relates generally to brushes, and particularly to a novel form of brush made from wood fiber.

The object of the invention is to present a cheap, durable, and thoroughly efficient brush, which may be employed for many purposes in lieu of the ordinary bristle or jute brush of commerce and which shall possess advantages in point of cheapness and readiness of manufacture.

With these and other objects in view, as will appear as the nature of the invention is better understood, the same consists in the method of making a wood-fiber brush and the article produced thereby, as will be hereinafter fully described and claimed.

In the accompanying drawings, forming a part of this specification, and in which like numerals of reference indicate corresponding parts, there are illustrated two forms of embodiment of the invention capable of carrying the same into practical operation, it being understood that the elements therein exhibited may be varied or changed as to shape, proportion, and exact manner of assemblage without departing from the scope of the invention, and in these drawings—

Figure 1 is a view in perspective of a brush constructed in accordance with the present invention, a portion of the holding-band being broken away to show the manner in which the stock of the brush is secured to the handle. Fig. 2 is a vertical sectional view taken on the line 2 2, Fig. 1, and looking in the direction of the arrow thereon. Fig. 3 is a view in perspective of the brush-head detached from the handle, showing particularly the division-line between the stock and the fibers, the brush being folded ready to be placed upon the handle. Fig. 4 is a perspective detail view of a slightly-modified form of brush, the handle being broken away. Fig. 5 is a view in plan of the brush shown in Fig. 4.

The brush of the present invention is constructed from the bark of a tree the fibers of which are capable of being segregated or separated in the form of bristles. Any bark suited to this purpose may be employed; but it has been found in practice that the bark of the *Bōmbax ceiba*, or silk-cotton tree, a tree indigenous to South America, is best suited to the purpose, for the reason that the steps necessary to separate the bark into fibers or bristles may be accomplished in a ready and simple manner.

In carrying the invention into effect the bark is removed from the tree in pieces of suitable size and the outer skin or cortical is detached therefrom. This may be effected either mechanically or manually, as may be preferred. The bark is then taken and submerged in a bath of water, where it is left from five to fifteen days to effect fermentation in order to remove the gum contained in the bark to permit the subsequent fibering of the bark to be readily carried out. The gum contained in the bark of this tree is non-resinous, being slimy or sticky to the touch, and is readily soluble in water. The time of immersion of the bark in the water to effect perfect fermentation, and thus removal of all the gum therefrom, will be governed by the temperature of the atmosphere, fermentation taking place more rapidly and effectively in very hot weather than when the weather is cool. When the bark is entirely freed from the gum, it is taken and while still wet is cut into strips of a width equal to the length of the brush-body and is then subjected to a carding action to split or divide the bark up into fibers or bristles. Of course in carrying out this procedure there will be more or less loose fibers detached from the stock, and these may be removed after the fibered stock has been dried by subjecting it to a blast of air or otherwise. In this form the brush-head may be sold as an article of manufacture and may be applied by the purchaser to the handle in any preferred manner, one way of carrying out this part of the invention being shown in the drawings, wherein the brush-body 1, comprising the stock 2 and fibers 3, is folded around one end of a handle 4, as shown in Figs. 3 and 5, after which a metallic band 5 is bent around the stock 2 and is held in place on the handle by nails or rivets 6, of which there may be any preferred number. In the structure shown in Figs. 1, 2, and 3 the meeting edges of the brush-head are at one side of the handle, and in the form shown in Figs. 4 and 5 the meeting edges of the brush-head are intermediate of the sides of the brush-handle, and in this latter form of brush supplemental fastening devices 7 are employed for holding the brush-head associated with the handle prior to the application of the holding-band 5, these latter fastening devices being disposed adjacent to the meeting edges of the terminals of the brush-head. In the form of bush shown in Figs. 1, 2, and 3 a single thickness of the treated bark constitutes the brush-head, while in the forms of brush shown in Figs. 4 and 5 two thicknesses of bark are employed, thus to make a heavier and thicker brush.

By forming the fibers or bristles 3 integral with the stock 1 the employment of cement or the like for holding loose fibers, such as bristles or the like, assembled with the brush-handle is entirely obviated, so that the manufacture of a brush under the present procedure will not require the employment of skilled labor.

Having thus fully described my invention, what I claim as new, and desire to secure by Letters Patent, is—

The method of making a brush from wood bark, which consists in fermenting the bark to remove the contained gum, then, while still wet, cutting the bark into strips of a width equal to the length of the brush-body and then subjecting the strips to suitable carding mechanism to split or divide the bark into fibers or bristles.

In testimony that I claim the foregoing as my own I have hereto affixed my signature in the presence of two witnesses.

AUGUST GISSLER.

Witnesses:
C. E. DOYLE,
FRANK S. APPLEMAN.